L. H. KEIM.
FLEXIBLE COUPLING.
APPLICATION FILED AUG. 12, 1912.

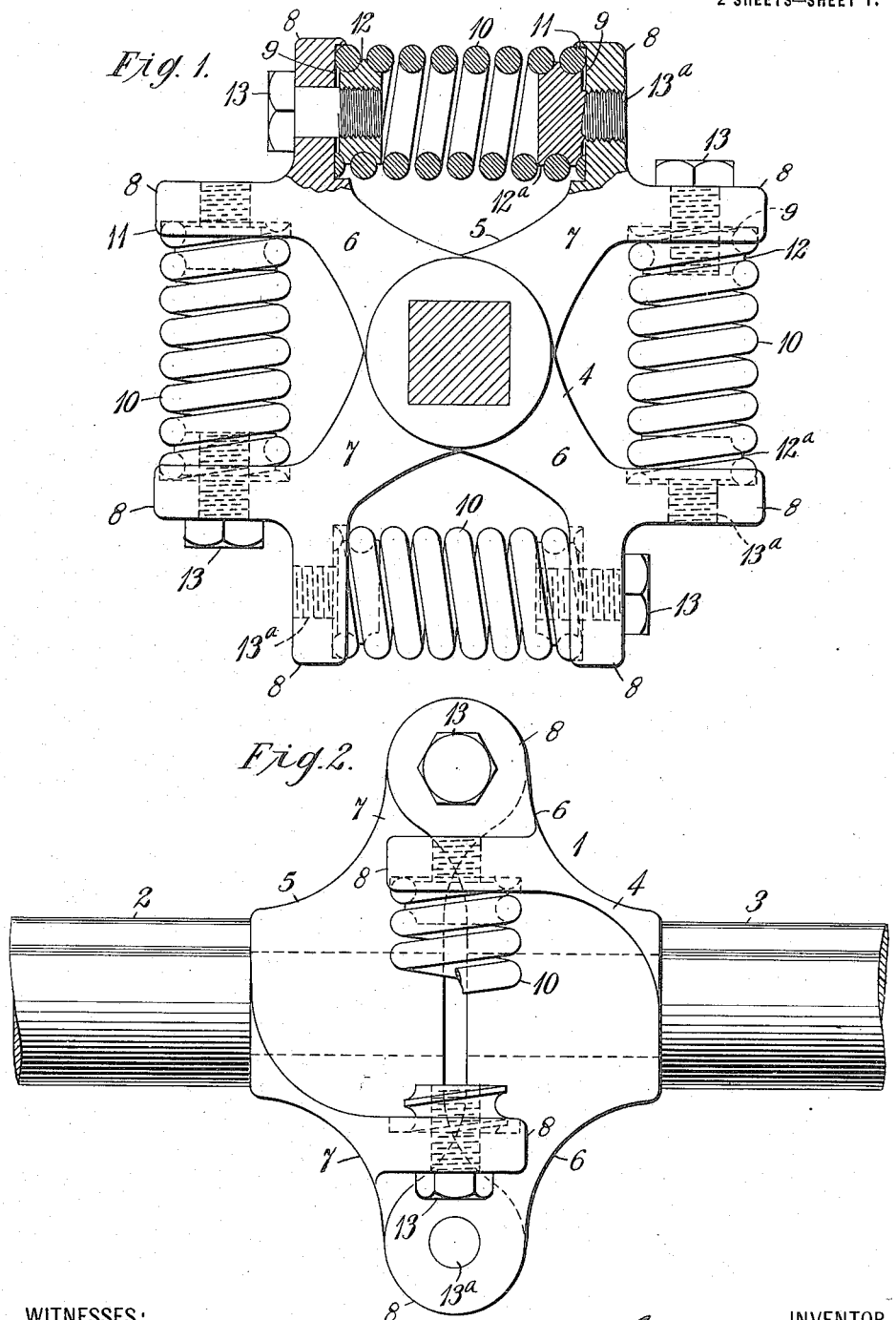

1,194,336.

Patented Aug. 8, 1916.
2 SHEETS—SHEET 2.

WITNESSES:
Fred H. Miller

INVENTOR
Lester H. Keim
BY
Wesley S. Carr
ATTORNEY

UNITED STATES PATENT OFFICE.

LESTER H. KEIM, OF PITTSBURGH, PENNSYLVANIA, ASSIGNOR TO R. D. NUTTALL COMPANY, A CORPORATION OF PENNSYLVANIA.

FLEXIBLE COUPLING.

1,194,336.           Specification of Letters Patent.      Patented Aug. 8, 1916.

Application filed August 12, 1912. Serial No. 714,496.

*To all whom it may concern:*

Be it known that I, LESTER H. KEIM, a citizen of the United States, and a resident of Pittsburgh, in the county of Allegheny and State of Pennsylvania, have invented a new and useful Improvement in Flexible Couplings, of which the following is a specification.

My invention relates to flexible couplings and particularly to devices of this character which are employed for connecting two shafts or other machine elements in such manner as to insure operation of such parts in substantial unison and also permit a small degree of relative movement in any direction.

The object of my invention is to provide a device of the character indicated which shall be of simple and, at the same time, rugged construction, which shall provide the desired degree of flexibility without liability of rupture or disarrangement of parts, and which may be quickly assembled with facility.

Figure 3:
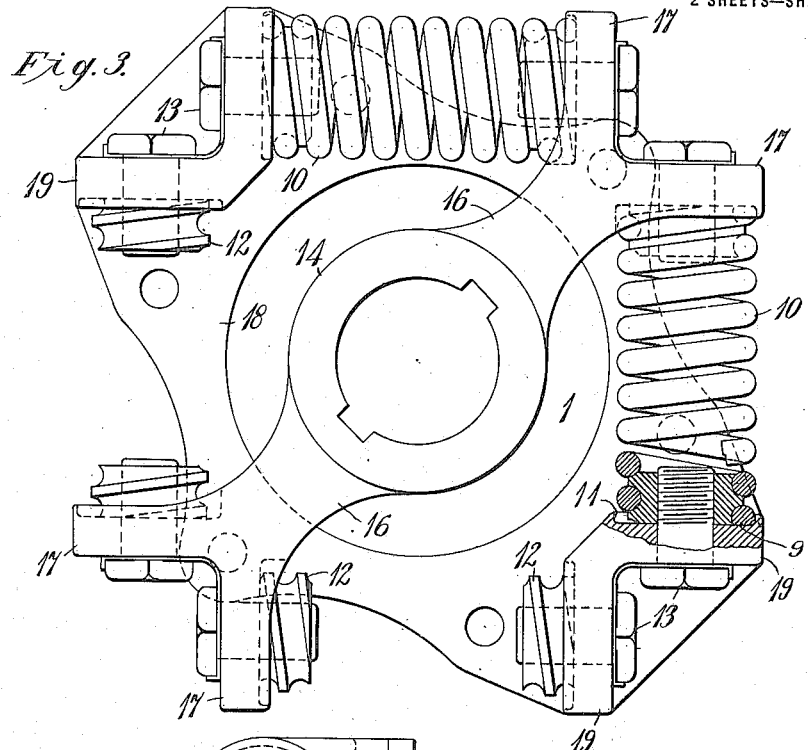
Figure 4:
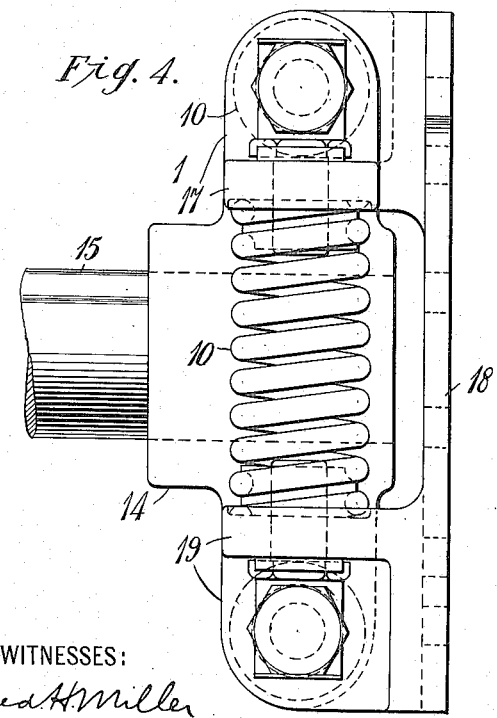
Figure 5:
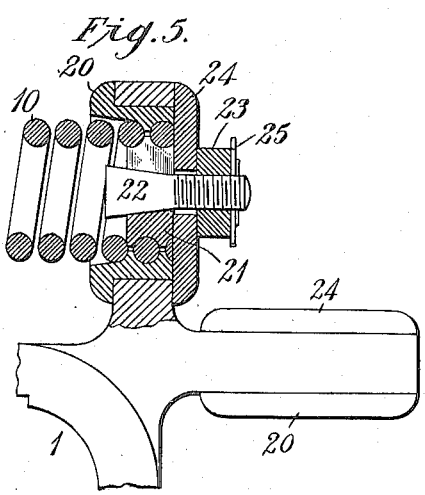

In the accompanying drawing, Figure 1 is a view, mainly in end elevation but partially in section, of a coupling embodying my invention, and Fig. 2 is a side elevation of the coupling shown in Fig. 1, and portions of two shafts to which the coupling is applied, one of the springs being partially broken away. Figs. 3 and 4 are views corresponding respectively to Figs. 1 and 2 that illustrate a modified application of the invention. Fig. 5 is a sectional fragmentary view of a modified spring-clamping means.

As shown in Figs. 1 and 2 of the drawings, the coupling 1 is employed to connect the adjacent ends of two shafts 2 and 3 and comprises two spider frames 4 and 5, the body portions of which are provided with central rectangular openings to receive and closely fit the squared ends of the corresponding shafts 2 and 3.

The member 4 is provided with two oppositely and laterally projecting arms 6 and the member 5 is provided with similar arms 7. The outer end of each of the arms 6 and 7 is provided with two branches 8 at right angles to each other, the inner opposing faces of which are provided with seats 9 of cup shape to receive the ends of helical springs 10, the seats being of cylindrical contour and having peripheral walls 11 which project to any desired degree to engage the outer peripheries of the end turns of the springs, as is clearly indicated in Fig. 1.

Blocks 12 and $12^a$ are screwed into the respective ends of each spring 10, their external contours being such as to conform to the internal contour of the spring and bolts 13 are screwed into the blocks 12 to draw the corresponding ends of the springs into their seats 9 and hold them rigidly therein. The other ends of the springs may be clamped to their seats in the same manner and by like means or preferably, as shown, each block $12^a$ may have a threaded stud $13^a$ that is screwed into the corresponding part 8.

By employing the block $12^a$ at one end, the number of parts is reduced and lightness and compactness is secured, which would otherwise be impossible by reason of the additional space that would be required to accommodate the adjacent heads of bolts with ample clearance between them.

The parts 8 are so located, with reference to the arms 6 and 7 that the axes of the seats 9 and springs 10 are all in a single plane perpendicular to the shafts 2 and 3, and, in view of the manner in which the ends of the spring are gripped and clamped to the parts 8, there is no possibility of disarrangement of the members of the coupling and a strong, durable and, at the same time, sufficiently yielding coupling is provided.

Referring to Figs. 3 and 4 of the drawings, the springs and their supporting and clamping means are substantially the same as the corresponding parts shown in Figs. 1 and 2 and are designated by the same reference numerals. In this modification, however, the body member 14 is adapted to be attached to the end of a cylindrical shaft 15 by means of one or more keys or splines and is provided with arms 16 having end members 17 corresponding to the parts 8 of Figs. 1 and 2. The other body member 18 is in the form of a block or plate having laterally projecting parts 19 that correspond, in form and location, to the parts 8 of the arms 6 and 7 shown in Figs. 1 and 2.

In Fig. 5, I have shown a portion of a structure shown in Figs. 1 and 2, but embodying a different means for clamping the ends of the springs 10 to the parts 8. As here shown, a flanged thimble 20 is screwed upon the end of each spring and fits into an opening in the part 8. A block 21 is screwed into the end of each spring and is provided with an outwardly projecting bolt 22 to receive a clamping nut 23, a washer 24 being interposed between the nut and the part 8. I have shown the outer end of the bolt 22 as also provided with a transverse hole in which is located a cotter pin 25.

It will, of course, be understood that the structure may be otherwise modified within the scope of the appended claims, if desired.

I claim as my invention:

1. A flexible coupling comprising two side-by-side members severally provided with lateral projections having opposing seats, in combination with a set of helical springs interposed between the projections and coöperating with said opposing seats, blocks screwed into the ends of said springs, and bolts coöperating with said blocks to clamp the ends of the springs into said seats in the projections.

2. A flexible coupling comprising two members severally having laterally projecting parts having seats therein, a set of helical springs interposed between said laterally projecting parts and coöperating with said seats, blocks screwed into the ends of the springs, and bolts coöperating with said blocks to clamp the ends of the springs into said seats in the laterally projecting parts.

3. A flexible coupling comprising two side-by-side members having laterally projecting parts provided with opposing sockets, helical springs having their ends seated in said sockets, blocks screwed into the ends of said springs, and bolts coöperating with said blocks and said projecting parts to clamp the ends of the springs in the sockets.

4. A flexible coupling comprising a pair of side-by-side members having alined shaft sockets and laterally projecting arms each provided with two sockets at right angles to each other, helical springs having their ends seated in said sockets, blocks screwed into the ends of said springs and bolts projecting through said arms and sockets and engaging said blocks for clamping the ends of the springs in the sockets.

5. A flexible coupling comprising two side-by-side members each of which is provided with lateral projections at substantially right angles to each other, and having substantially cylindrical recesses therein, a set of uniform helical springs, substantially cylindrical blocks screwed into the ends of said springs, and means coöperating with said blocks and said projections for clamping said springs in an axial direction into said recesses.

6. A flexible coupling comprising relatively movable members provided with projecting portions having recesses therein, a plurality of helical springs having their ends seated in said recesses, blocks screwed into one end of said springs and screw threaded into certain of said projecting portions, blocks screwed into the other ends of said springs, and bolts projecting through the remaining projecting portions and engaging said second blocks.

7. A flexible coupling comprising relatively movable members provided with projecting arms having opposing recesses therein, a helical spring seated in said recesses, blocks screwed into the ends of said spring, one of which is adapted to be screwed into one of said projecting arms, and a bolt projecting through the other arm and engaging the other block.

8. A flexible coupling comprising relatively movable members severally provided with projecting arms having opposing recesses therein, a helical spring seated in said recesses, blocks screwed into the respective ends of said spring and means coöperating with each block and adapted to be screwed in the same direction for clamping the ends of said spring into said recesses.

9. A flexible coupling comprising relatively movable members severally provided with pairs of arms projecting at substantially right angles to each other and having recesses therein, helical springs having their ends seated in said recesses, blocks coöperatively engaging the ends of said springs, certain of said blocks having screw-threaded engagement with corresponding arms of each pair, and bolts severally coöperating with the remaining blocks and arms of each pair.

10. The combination with a member having a cylindrical seat in one face thereof, and a cylindrical helical spring having its end disposed in said seat and engaging the circumferential walls thereof, of a solid cylindrical threaded block screwed into the end of said spring, and a bolt projecting through said member and engaging said block for clamping the end of said spring to said member.

In testimony whereof, I have hereunto subscribed my name this 6th day of August, 1912.

LESTER H. KEIM.

Witnesses:
D. H. MACE,
B. B. HINES.